US009858813B2

United States Patent
Kim et al.

(10) Patent No.: US 9,858,813 B2
(45) Date of Patent: Jan. 2, 2018

(54) METHOD FOR PROVIDING SOUND DETECTION INFORMATION, APPARATUS DETECTING SOUND AROUND VEHICLE, AND VEHICLE INCLUDING THE SAME

(71) Applicant: Hyundai Motor Company, Seoul (KR)

(72) Inventors: Jae Kwang Kim, Seoul (KR); Yoon Ho Jang, Seoul (KR)

(73) Assignee: Hyundai Motor Company, Seould (KR)

( * ) Notice: Subject to any disclaimer, the term of this patent is extended or adjusted under 35 U.S.C. 154(b) by 0 days.

(21) Appl. No.: 15/389,319

(22) Filed: Dec. 22, 2016

(65) Prior Publication Data

US 2017/0309175 A1 Oct. 26, 2017

(30) Foreign Application Priority Data

Apr. 21, 2016 (KR) .................. 10-2016-0048643

(51) Int. Cl.
*G08G 1/09* (2006.01)
*G08G 1/0967* (2006.01)
*G08G 1/04* (2006.01)

(52) U.S. Cl.
CPC ............ *G08G 1/0967* (2013.01); *G08G 1/04* (2013.01)

(58) Field of Classification Search
CPC ............................ G08G 1/0967; G08G 1/056
See application file for complete search history.

(56) References Cited

U.S. PATENT DOCUMENTS

2013/0009791 A1* 1/2013 Yoshioka ............... G08G 1/166
340/935

FOREIGN PATENT DOCUMENTS

| JP | H06-344839 A | 12/1994 |
|---|---|---|
| JP | 9-128697 A | 5/1997 |
| JP | 2007-91028 A | 4/2007 |
| JP | 2007-122201 A | 5/2007 |
| JP | 2008-151766 A | 7/2008 |
| JP | 2008-207793 A | 9/2008 |
| JP | 4309184 B2 | 8/2009 |
| JP | 2011-201406 A | 10/2011 |
| JP | 2011-242343 A | 12/2011 |
| JP | 2014-67091 A | 4/2014 |
| JP | 2014-102802 A | 6/2014 |
| WO | WO 2010/035434 A1 | 4/2010 |

* cited by examiner

*Primary Examiner* — Curtis Odom
(74) *Attorney, Agent, or Firm* — Morgan, Lewis & Bockius LLP

(57) ABSTRACT

A method for providing sound detection information producing a result of sound detection based on sound data generated by detecting sound generated around a host vehicle, may include determining an opposite lane vehicle detection index based on the result of sound detection, the opposite lane vehicle detection index forming a basis of determination of presence or absence of an opposite lane vehicle, and controlling a notification of a neighboring vehicle travelling around the host vehicle or controlling the host vehicle according to the opposite lane vehicle detection index, wherein the result of sound detection is information about the probability of presence of the neighboring vehicle for respective angles in frames consecutive over time.

13 Claims, 9 Drawing Sheets

METHOD FOR PROVIDING SOUND DETECTION INFORMATION, APPARATUS DETECTING SOUND AROUND VEHICLE, AND VEHICLE INCLUDING THE SAME

CROSS-REFERENCE TO RELATED APPLICATION

The present application claims priority to Korean Patent Application No. 10-2016-0048643, filed on Apr. 21, 2016, the entire contents of which is incorporated herein for all purposes by this reference.

BACKGROUND OF THE INVENTION

Field of the Invention

The present invention relates to a method for providing sound detection information, an apparatus for detecting sound around a vehicle, and a vehicle including the same, and more particularly, to a method for providing sound detection information, an apparatus for detecting sound around a vehicle, and a vehicle including the same which may accurately recognize a neighboring vehicle travelling around the vehicle.

Discussion of the Related Art

Various sounds are generated around a travelling vehicle. However, an elderly person having hearing impairment or a driver having a poor sense of direction concerning hearing may be less responsive to specific sounds (e.g., the honk of a horn, the sound of a siren, etc.) to which the driver should pay attention. In addition, with gradual development of vehicle technology, even persons having a keen sense of hearing often encounter a situation where they cannot accurately sense a noise generated outside the vehicle. Moreover, driving safety may be threatened if the driver recognizing a specific sound generated on the back of the vehicle turns around to check the sound.

Thus, there is a need for a technology to report information about a specific sound such as the source and direction of the generated sound without undermining driving safety. In particular, there is a need for a technology to promote driving safety by generating a notification of a plurality of vehicles travelling around the vehicle of the driver.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for providing sound detection information, an apparatus for detecting sound around a vehicle, and a vehicle including the same that substantially obviate one or more problems due to limitations and disadvantages of the related art.

Various aspects of the present invention are directed to providing a method for providing sound detection information, an apparatus for detecting sound around a vehicle, and a vehicle including the same which are configured for providing accurate information about a plurality of neighboring vehicles travelling around the vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure pointed out in the written description and claims hereof as well as the appended drawings.

To achieve these objects and other advantages and in accordance with the purpose of the invention, as embodied and broadly described herein, a method for providing sound detection information includes producing a result of sound detection based on sound data generated by detecting sound generated around a host vehicle, determining an opposite lane vehicle detection index based on the result of sound detection, the opposite lane vehicle detection index forming a basis of determination of presence or absence of an opposite lane vehicle, and controlling a notification of a neighboring vehicle travelling around the host vehicle or controlling the host vehicle according to the opposite lane vehicle detection index, wherein the result of sound detection is information about the probability of presence of the neighboring vehicle for respective angles in frames consecutive over time.

In another aspect of the present invention, an apparatus for detecting sound around the vehicle includes a sound detection device for producing a result of sound detection based on sound data generated by detecting sound generated around a host vehicle, an opposite lane vehicle detector for determining an opposite lane vehicle detection index based on the result of sound detection, the opposite lane vehicle detection index forming a basis of determination of presence or absence of an opposite lane vehicle, and a notification generator for generating a notification of a neighboring vehicle travelling around the host vehicle according to the opposite lane vehicle detection index, wherein the result of sound detection is information about the probability of presence of the neighboring vehicle for respective angles in frames consecutive over time.

In another aspect of the present invention, a vehicle includes a multichannel microphone for generating sound data by detecting sound generated around a host vehicle, a sound detection apparatus for determining an opposite lane vehicle detection index based on a result of sound detection produced based on the sound data and generating a notification of a neighboring vehicle travelling around the host vehicle according to the opposite lane vehicle detection index, the opposite lane vehicle detection index forming a basis of determination of presence or absence of an opposite lane vehicle, a notification output device for visibly or audibly delivering the notification of the neighboring vehicle to the driver, wherein the result of sound detection is information about a probability of presence of an object corresponding to a target sound source at respective angles in frames consecutive over time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
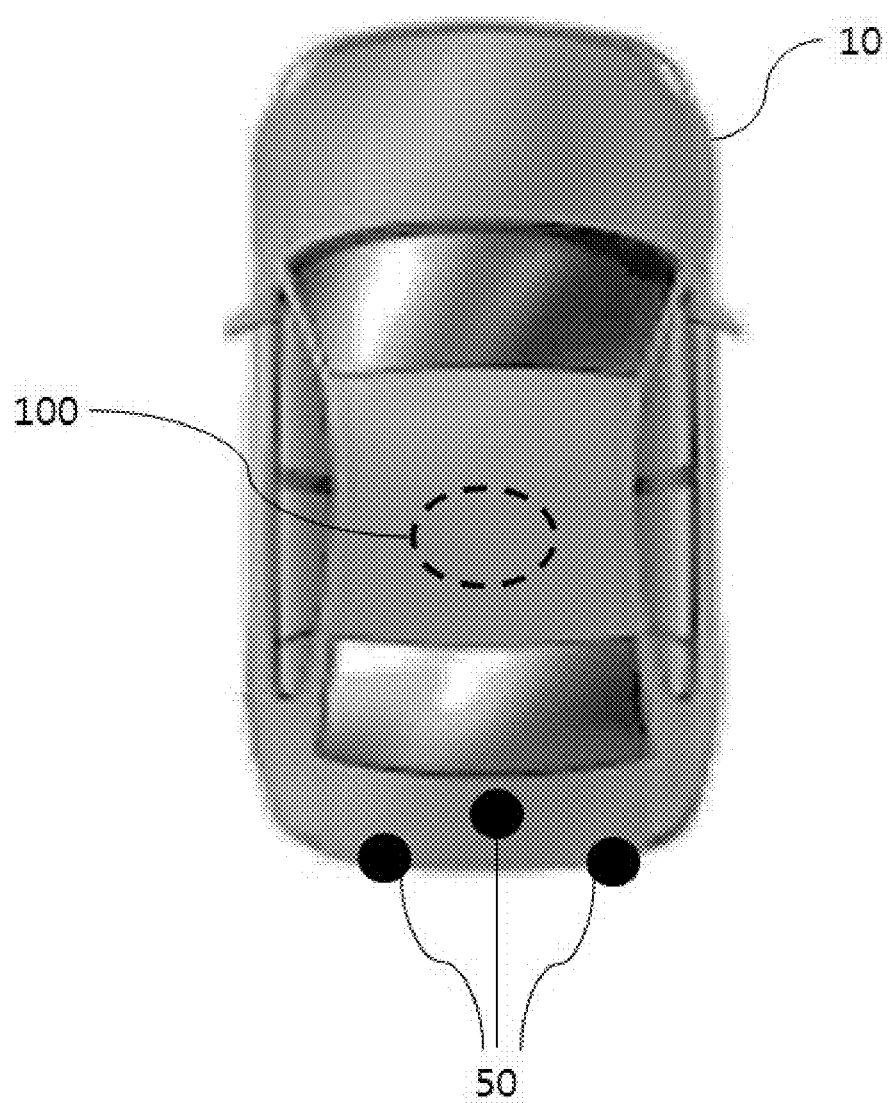
FIG. 1 illustrates a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts. As used herein, the suffixes "module" and "unit" are added or used interchangeably to simply facilitate preparation of this specification and are not intended to suggest meanings or functions distinguished therebetween.

FIG. 1 illustrates a vehicle according to an exemplary embodiment of the present invention.

Referring to FIG. 1, a vehicle 10 may report information about a specific sound including the source and direction of the sound generated around the vehicle during travel according to manipulation of the driver.

The vehicle 10 may include multichannel microphones 50 configured for collecting external sound and a sound detection apparatus 100 configured for generating information about specific sound based on the collected sound information. Each of the multichannel microphones 50 may be understood as one channel. The number of the multichannel microphones 50 (i.e., 3) and the installation position thereof on the vehicle 10 are not limited to the example illustrated in FIG. 1.

Operation of the sound detection apparatus 100 will be described in detail with reference to FIG. 2 later in this specification.

Figure 2:
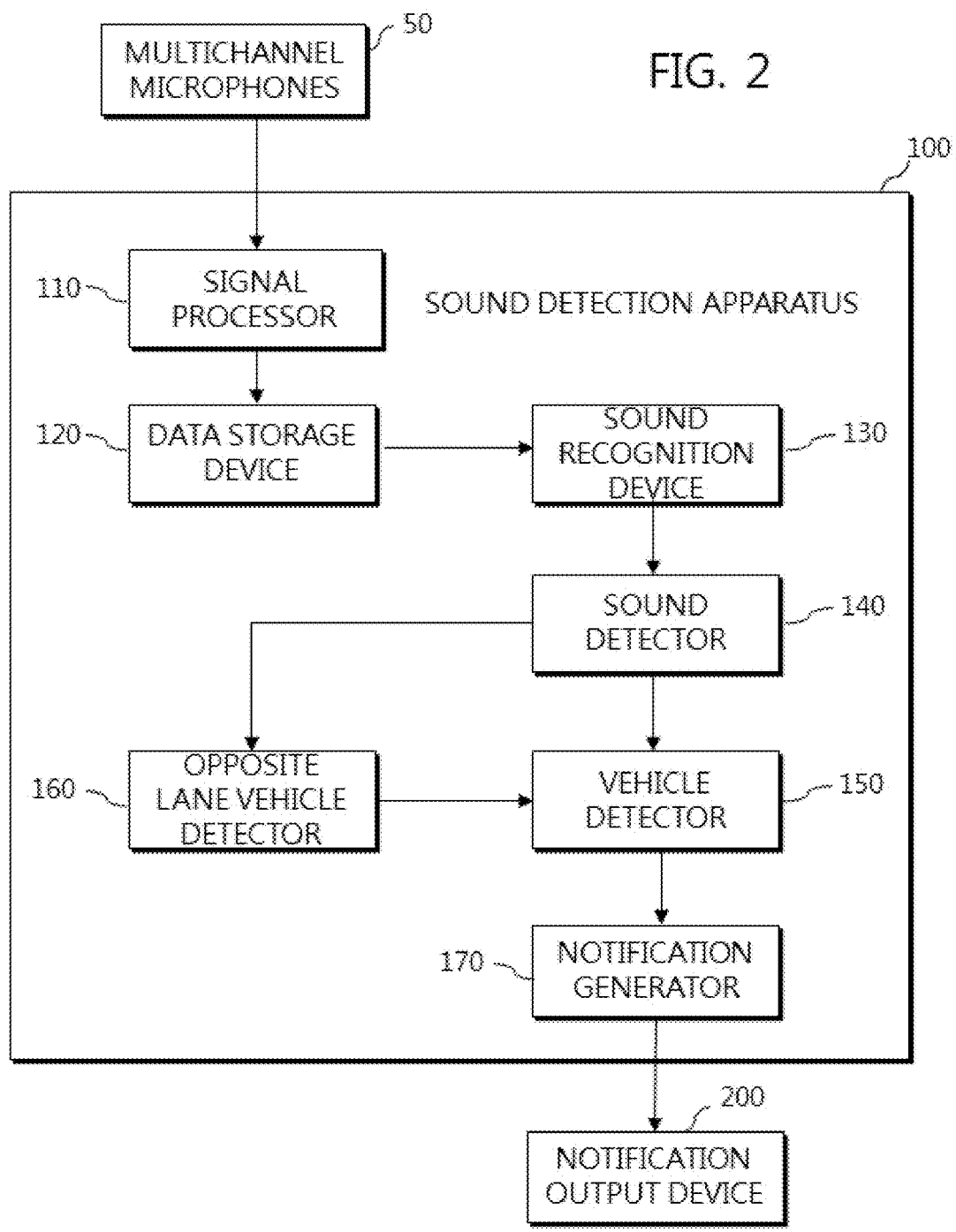
FIG. 2 is a block diagram illustrating the sound detection apparatus shown in FIG. 1.

FIG. 2 is a block diagram illustrating the sound detection apparatus shown in FIG. 1.

Referring to FIG. 2, the sound detection apparatus 100 may include a signal processor 110, a data storage device 120, a sound recognition device 130, a sound detector 140, a vehicle detector 150, an opposite lane vehicle detector 160, and a notification generator 170. The sound detection apparatus 100, which is designed for a vehicle, may be implemented as a portion of a head device of the vehicle 10, but embodiments of the present invention are not limited thereto.

The multichannel microphones 50 may sense sound generated around the vehicle 10, generate sound data through analog-to-digital conversion, and transmit the generated sound data to the signal processor 110.

Various sounds are present around a vehicle. The sounds include engine sound or frictional sound of tires of other vehicles positioned around the vehicle, sound generated from a traffic light, an electronic display and the like, and typical sound of nature.

During driving, the driver wants to know the movement of an unwatchable vehicle which is travelling in front of, at one side of, at rear left or right side of, or behind the vehicle 10 (e.g., whether the vehicle intends to pass the vehicle of the driver) and the relative position thereof.

Some of the external sounds are not transferred to the driver as they are blocked by a soundproof system of the vehicle 10. When the driver hears a horn outside the vehicle 10 honking, the driver wants to know where this honk comes from and whether or not the honk is directed at the driver. Depending on whether the driver recognizes the honk of the horn, the driver may take various measures including, for example, accelerating the vehicle, changing lanes, and operating the emergency light.

In addition, the driver may fail to hear the honk of a horn as the volume of the audio system in the vehicle of the driver is set to an excessively high level. In the instant case, the driver needs to be notified that the horn has been honked around the vehicle of the driver, in a visual manner or through the audio system of the vehicle.

The driver may be interested in other sounds as well. For example, when the vehicle makes a sudden stop, large frictional sound is generated due to friction between the tires and the ground. Such frictional sound may be related to occurrence of a traffic accident or a situation immediately before a traffic accident and thus requires the driver's attention. As another example, when an accident is caused by collision with another vehicle, a crashing sound is made. When the sound made by front crash or side crash is recognized and the driver is notified of the direction in which the crashing sound comes, other subsequent accidents may be prevented.

If a police car or ambulance near the driver blows a siren, the driver should take a measure such as changing lanes to allow the police car or ambulance to pass by. In a particular case, the user may face legal punishment if he does not take necessary measures. Accordingly, there is a need for a technology enabling the driver to recognize the sound of a siren from a vehicle belonging to a public organization.

The signal processor 110 may perform noise filtering on the acquired sound data. Through noise filtering, various noises whose properties or sources are unrecognizable may be removed. Most sounds in which the user is interested, including the honk of a horn, the sound of a siren, the frictional sound of tires, and a crashing sound, have sufficiently high decibel levels (higher than or equal to 70 dB). Accordingly, the signal processor 110 may determine whether the decibel level (i.e., the magnitude) of the sound data is higher than or equal to a threshold. That is, sound data whose decibel level is lower than the threshold may be removed by the signal processor 110.

The data storage device 120 may store the sound data with noises removed. The data storage device 120 may store the sound data on a frame-by-frame basis and provide the same to the sound recognition device 130 on the frame-by-frame basis. Herein, the frame may refer to sound data collected at the same time. The interval between frames may have a specific period (e.g., 40 ms, 100 ms, etc.). However, embodiments of the present invention are not limited thereto.

The sound recognition device 130 determines the features of the sound data. Sound data may not be significant to the driver even when the decibel level thereof is higher than or equal to a threshold. For example, sound made when a train passes and a noise made by an airplane near an airport have significantly high decibel levels, but may not significantly affect driving. Nor do noises made by road recovery or construction for road rearrangement significantly affect driving. Continuously notifying the driver of the sound data of such noises may only slow the response of the driver to a situation which the driver needs to recognize, or obstruct the driver from responding to the situation.

In the time domain or frequency domain, the sound recognition device 130 extracts feature values of the sound data received from the data storage device 120. The sound recognition device 130 may build a database of the average and variance of the feature values. Herein, the feature values may be the values of Mel-frequency cepstral coefficients (MFCC), total power spectrum, sub-band spectrum power, and/or pitch frequency. The sound recognition device 130 may store, in the database, the average and variance for the frames obtained within a predetermined time period, e.g., 100 ms.

Mel-frequency cepstrum (MFC) used in the field of voice signal processing is a method of representing a power spectrum of a short-term signal. The power spectrum of a short-term signal may be acquired by performing cosine transformation on the logarithmic power spectrum in the frequency domain in a non-linear Mel scale. MFCC refers to a collection of coefficients of multiple MFCs. Typically, according to the MFCC, the short-term sound data (signal) is subjected to pre-emphasis filtering and then to discrete Fourier transform. Thereafter, the power spectrum of the signal is estimated using Mel filter banks in Mel scale, and then a logarithmic operation is performed on the respective powers in Mel scale. Then, an MFCC value is obtained by applying discrete cosine transform to the value obtained through the logarithmic operation.

The total power spectrum represents distribution of energy of the total spectrum within a predetermined frame interval. Typically, sub-band powers represent energy distribution values of the spectrum in 4 sub-band intervals including [0, ⅛f0], [⅛f0, ¼f0], [¼f0, ½f0], and [½f0, f0]. The pitch frequency may be acquired by detecting the peak point of a normalized autocorrelation function.

The sound recognition device 130 may classify the feature values of the acquired sound data using a classifier and determine whether the acquired sound data corresponds to a sound in which the user is interested. The classifier may be one of a neural network (NN) classifier, a support vector machine (SVM) classifier, and a Bayesian classifier.

In this specification, it is assumed that the classifier is an NN classifier.

Using the feature values of the sound data acquired by classifying sounds into a plurality of classes according to the types of sounds, the classifier of the sound recognition device 130 may determine a confidence level based on similarity between the sound data and the plurality of classes. That is, a confidence level may represent a probability that the sound data corresponds to the sound of a specific class, and the total sum of the confidence levels may be 1.

The result of sound classification produced by the classifier of the sound recognition device 130 may include information about the respective classes, types of sound corresponding to the respective classes, and confidence levels corresponding to the respective classes.

The sound recognition device 130 may produce a determination result according to whether the confidence level is higher than or equal to a threshold (e.g., 0.7) and include the same in the sound classification result. That is, when the confidence level is higher than or equal to the threshold, the sound recognition device 130 may determine the type of sound of a class corresponding to the confidence level as the type of the present sound data.

Accordingly, the sound recognition device 130 may generate a sound classification result which is information about the type of sound corresponding to the sound data, by analyzing the features of the sound data.

The sound detector 140 may detect the direction of the source of generated sound, based on the sound data for the sound type (or target sound source) of a class having a confidence level higher than or equal to the threshold. The sound type may be provided from the sound recognition device 130.

The sound detector 140 may accumulate sound data corresponding to consecutive frames to identify the sameness of the sounds input through the respective microphones based on the visual features (waveforms) of the sounds, compare the intensities of the same sound and determine the difference in arrival time of the sounds reaching the respective microphones. The visual features may be provided by the sound recognition device 130.

The intensity of sound is inversely proportional to the square of distance. Accordingly, when the distance from the source of generated sound doubles, the intensity of the sound decreases to ¼ of the intensity (to about 6 dB). When it is assumed that the width and length of a typical vehicle is about 2 m and about 3 m, respectively, the difference in intensity of the detected sound may have a sufficiently significant value depending on the location of the point at which the sound is generated.

For example, when the multichannel microphones 50 are disposed as shown in FIG. 1, and a sound is generated at an upper right end portion of the vehicle, the intensity of the sound detected by the microphone positioned at the upper end portion of the vehicle is higher than the average of the intensities of the sound detected by the microphones positioned at the lower left and right end portions of the vehicle. In addition, the intensity of the sound detected by the microphone positioned at the lower right end portion is higher than the intensity of the sound detected by the microphone positioned at the lower left end portion of the vehicle.

Based on these properties, the approximate direction of the source of sound with respect to the center of the vehicle 10 may be detected using the intensities of the sound collected from the respective microphones.

Moreover, an angle corresponding to the position of the source of the generated sound may be determined using the difference between the arrival times of the sound that reaches the respective microphones. The sound detector 140 pre-stores a table of mapping between a network or the position of the source of the generated sound and a signal delay corresponding to each microphone. For example, in this table, the angle of FIG. 1 may be mapped to t1 (a signal delay for a first microphone), t2 (a signal delay for a second microphone), and t3 (a signal delay for a third microphone), and the probability of presence of a detected object at the angle of FIG. 1 may be determined by applying the signal delays of t1, t2 and t3 to the sound data for the respective microphones stored in the data storage device 120 and then summing the results of the application.

That is, by applying delay values for all angles to the present signal, the probability of presence of an object to be detected at each angle may be estimated. Accordingly, the position of the source of the sound may be estimated. This is possible because the angle for the position of the sound source has a one-to-one correspondence relationship with a combination of signal delays corresponding to the respective microphones.

Using such information, the sound detector 140 may produce a result of sound detection at each angle (angle with respect to the center of the vehicle 10) in each of temporally consecutive frames.

The result of sound detection may be information about the probabilities of presence of an object corresponding to a target sound source at the respective angles in each of the temporally consecutive frames.

In this specification, it is assumed that the target sound source is limited to frictional sound of tires of a vehicle. Therefore, the result of sound detection may be information about the probabilities that a vehicle (hereinafter, a "neighboring vehicle") travelling around an object (the vehicle 10) (hereinafter, a "host vehicle") corresponding to the frictional sound of tires is present at the respective angles in each of the temporally consecutive frames.

The vehicle detector 150 may generate information about a neighboring vehicle including presence or absence of the neighboring vehicle, the angle at which the neighboring vehicle is positioned, and the like, based on the probability of presence of the neighboring vehicle at each angle of the sound detection result.

The vehicle detector 150 may exclude information about a specific neighboring vehicle from the neighboring vehicle information based on the information provided from the opposite lane vehicle detector 160.

The vehicle detector 150 may deliver, to the notification generator 170, a detection signal for the neighboring vehicle information modified in reference to the information provided from the opposite lane vehicle detector 160.

The opposite lane vehicle detector 160 may compute a detection index of an opposite lane vehicle, which forms the basis of determination of presence of a vehicle in the opposite lane, based on the result of sound detection. To this end, the opposite lane vehicle detector 160 may determine a first vector F1, a second factor F2, and a third factor F3. The opposite lane vehicle detector 160 may provide the computed opposite lane vehicle detection index to the vehicle detector 150.

The opposite lane vehicle detection index and the first to third factors F1 to F3 will be described with reference to FIGS. 4 to 13 later.

While the present invention provides an example case where information about a specific neighboring vehicle is excluded from the neighboring vehicle information based on the opposite lane vehicle detection index, embodiments of the present invention are not limited thereto. The opposite lane vehicle detection index may be used for other kinds of notification (e.g., notification of blind spot detection (BSD), omission of warning for a vehicle in the opposite lane) or control (e.g., control according to recognition of travel in the first lane in the autonomous driving mode).

The notification generator 170 may generate a notification signal including the neighboring vehicle information.

A notification output device 200 provides the driver with information about a sound generating area based on the notification signal provided from the sound detection apparatus 100. The notification output device 200 may provide the information in a visible manner or an acoustic manner. It is also possible to provide the information in both the visual manner and the acoustic manner.

The notification output device 200 may be implemented in a head device up display (HUD) or a cluster to visually provide information about a sound generating area. The notification output device 200 may also be implemented in a navigation system connected for wired communication over, for example, a CAN bus or in a smart device (a smart phone, a tablet, a smartwatch, etc.) connected for short-range wireless communication through, for example, Bluetooth, NFC, or Wi-Fi.

Figure 3:
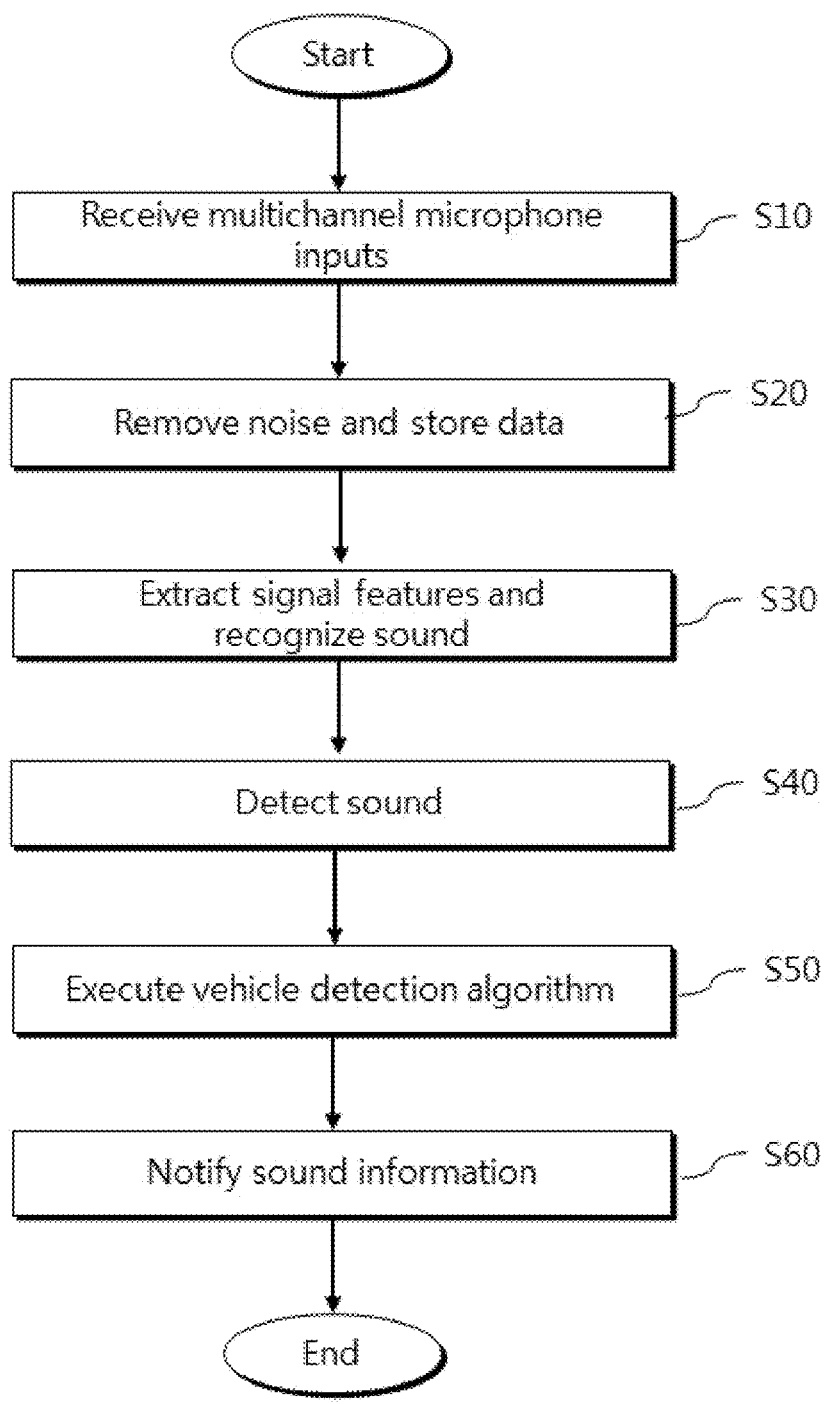
FIG. 3 is a flowchart illustrating operation of the sound detection apparatus shown in FIG. 2.
Figure 4:
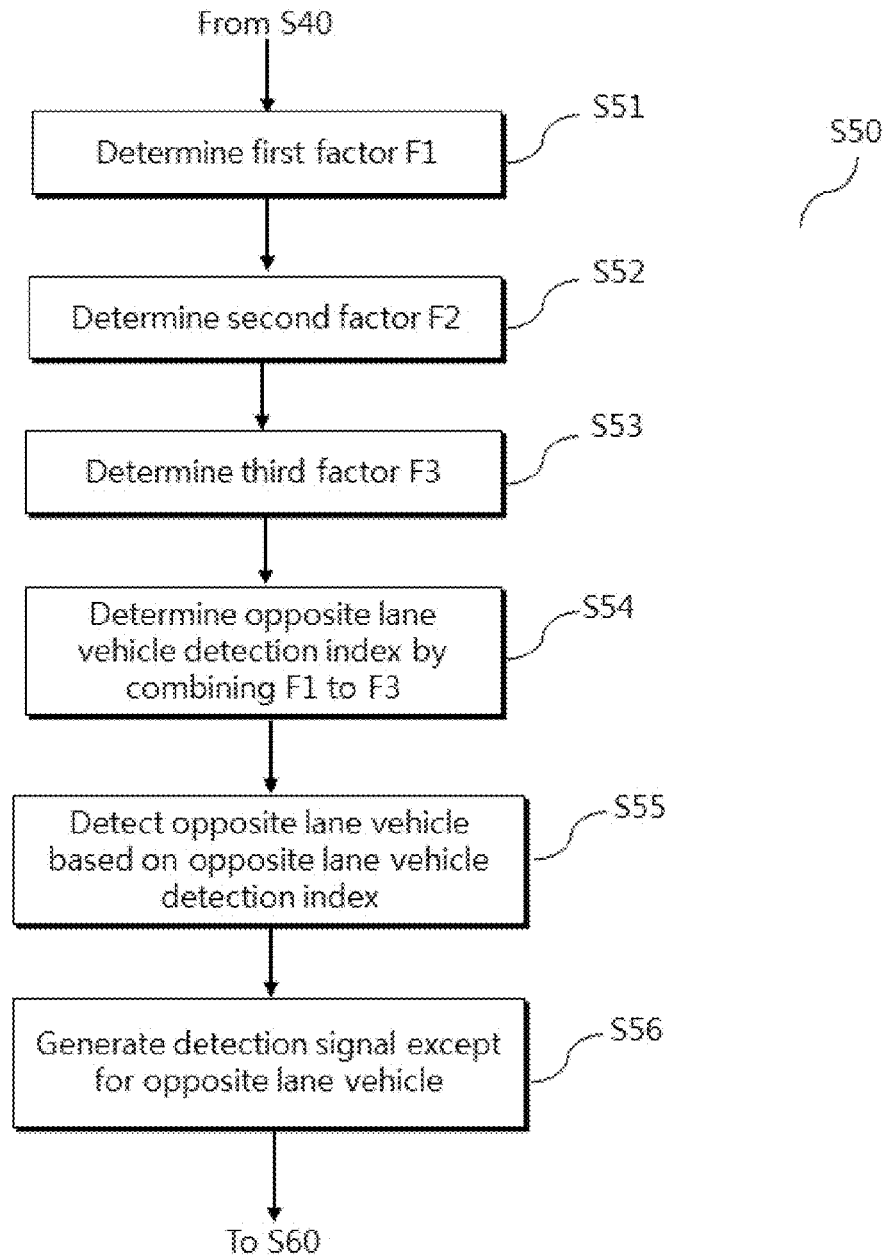
FIG. 4 is a flowchart specifically illustrating step S50 shown in FIG. 3.
Figure 5:
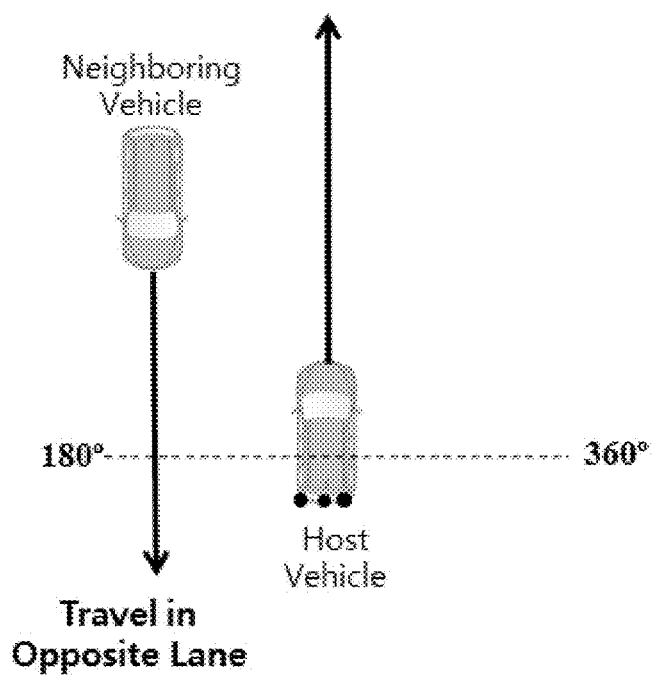
FIG. 5 and FIG. 6 illustrate an example of detection of a neighboring vehicle travelling in the opposite lane.
Figure 6:
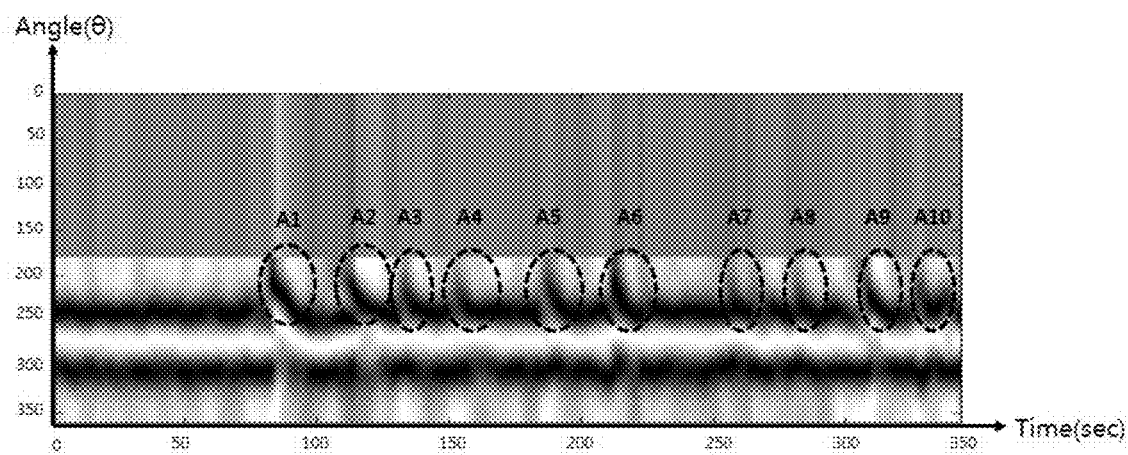
Figure 7:
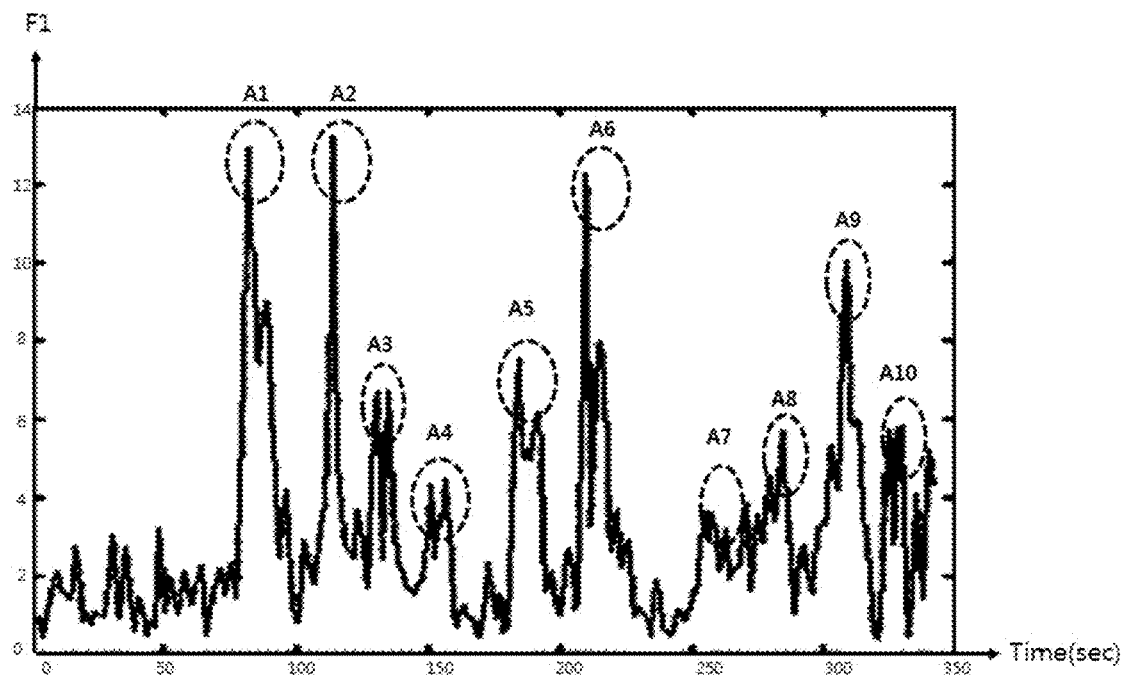
FIG. 7 illustrates an example of determination of a first factor.
Figure 8:
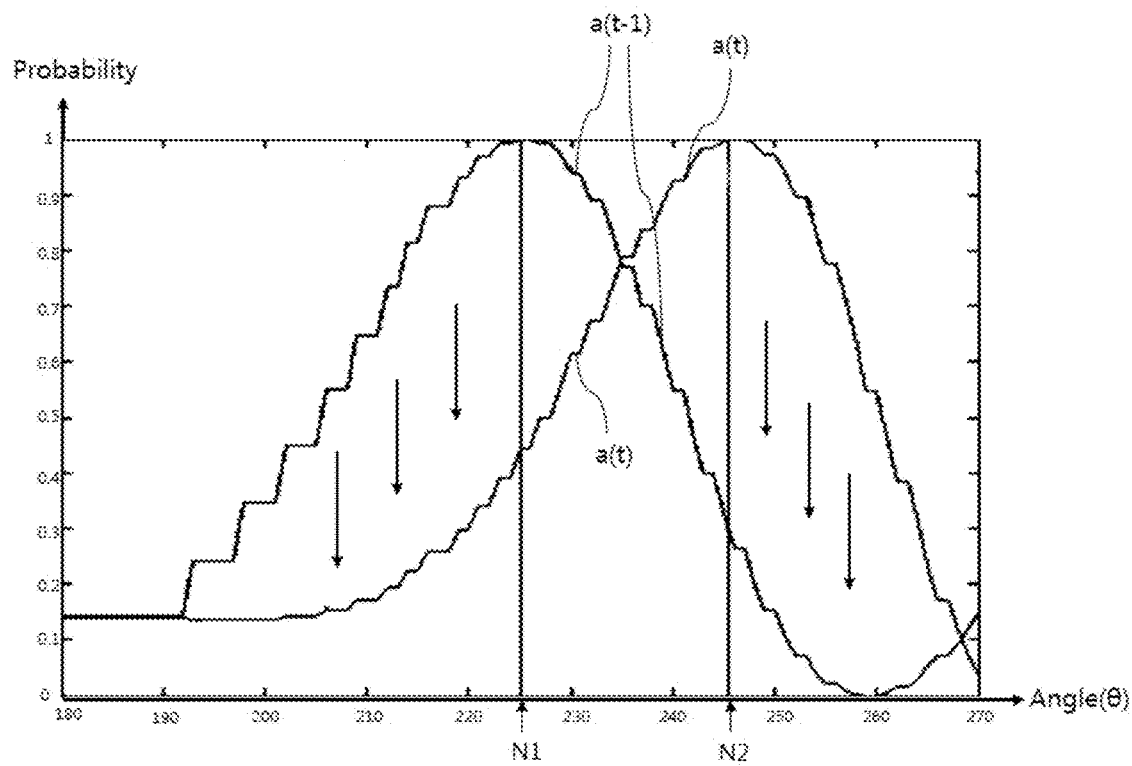
FIG. 8 illustrates an example of determination of a second factor.
Figure 9:
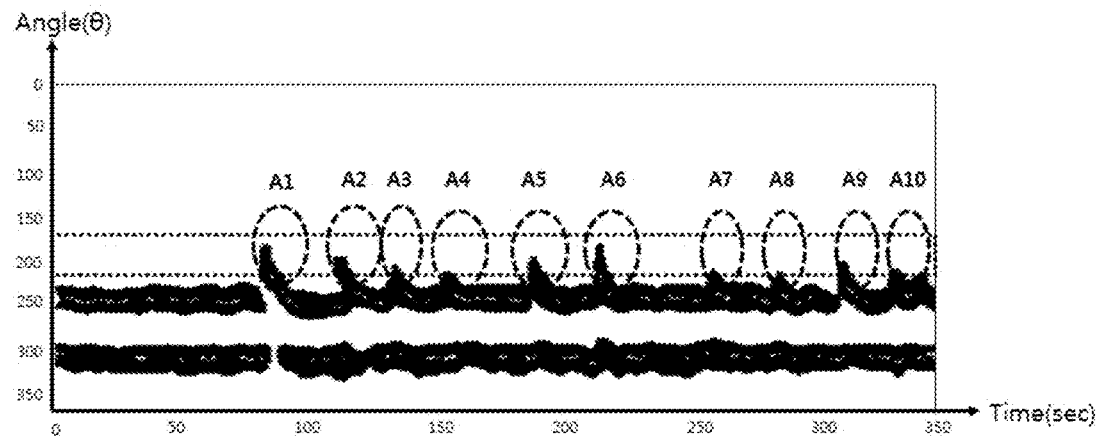
FIG. 9 and FIG. 10 illustrate an example of determination of a third factor.
Figure 10:
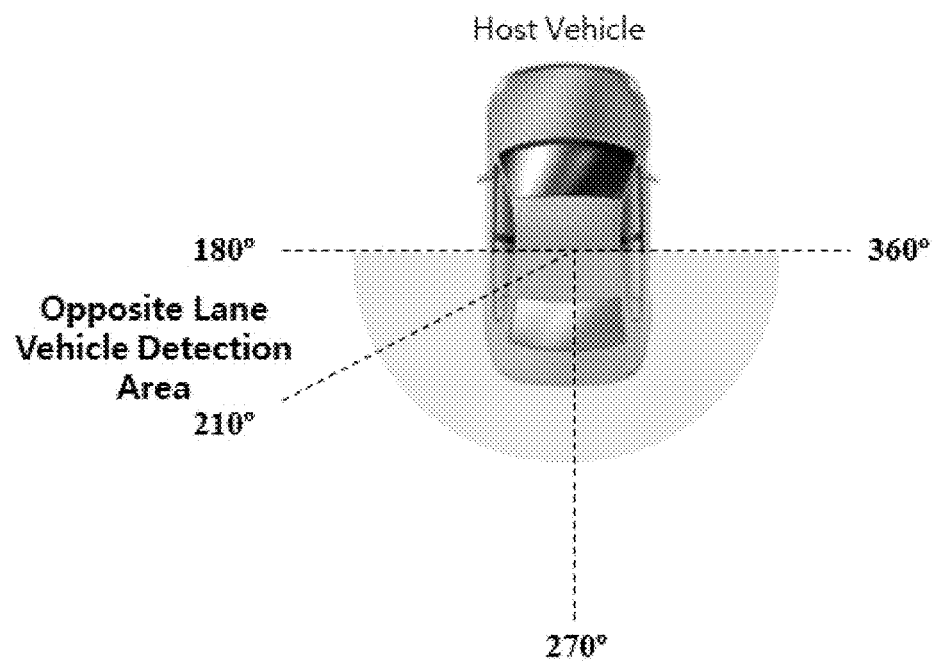
Figure 11:
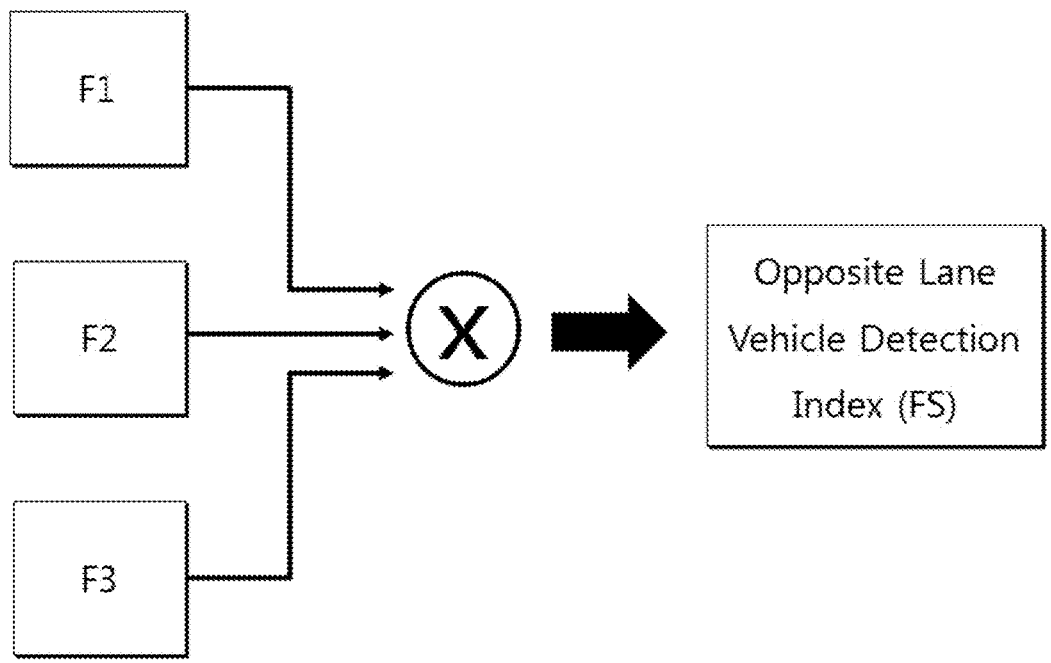
FIG. 11 illustrates an example of determination of an opposite lane vehicle detection index.
Figure 12:
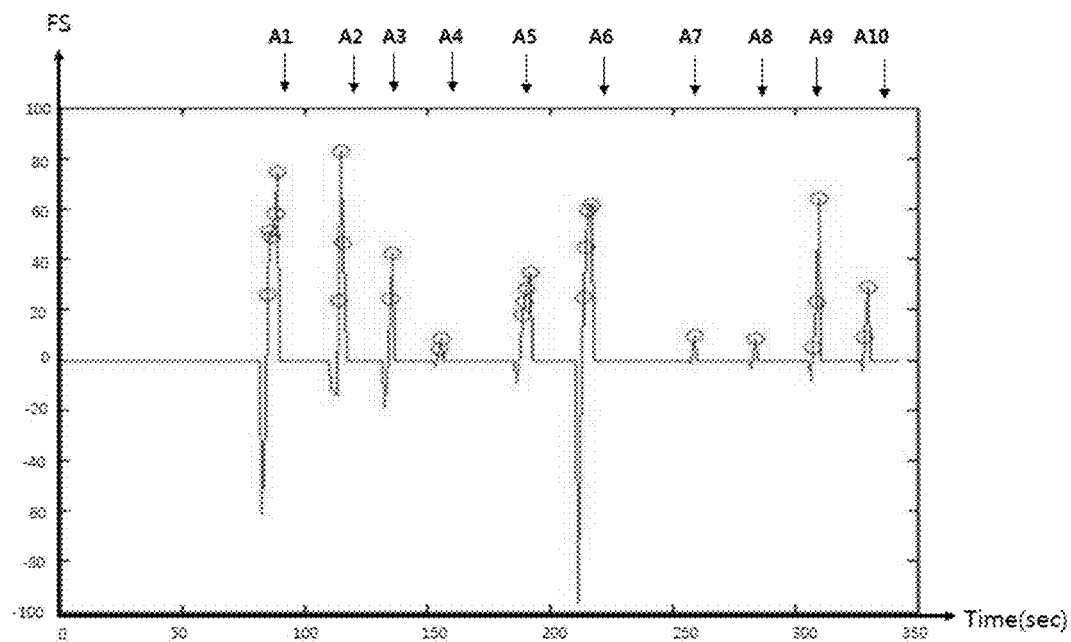
FIG. 12 illustrates a result of determination of the opposite lane vehicle detection index.
Figure 13:
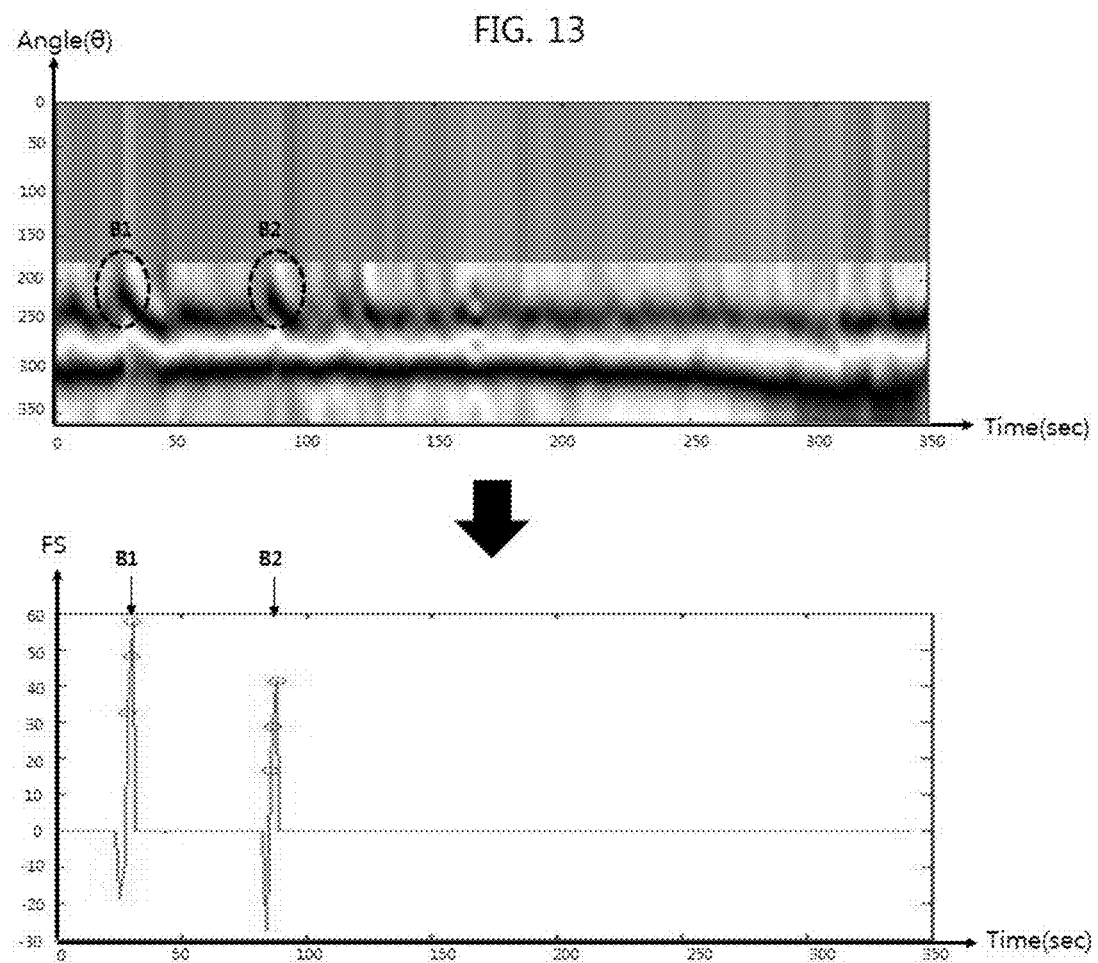
FIG. 13 illustrates another example of detection of a neighboring vehicle travelling in the opposite lane.

FIG. 3 is a flowchart illustrating operation of the sound detection apparatus shown in FIG. 2. FIG. 4 is a flowchart specifically illustrating step S50 shown in FIG. 3. FIG. 5 and FIG. 6 illustrate an example of detection of a neighboring vehicle travelling in the opposite lane. FIG. 7 illustrates an example of determination of a first factor. FIG. 8 illustrates an example of determination of a second factor. FIG. 9 and FIG. 10 illustrate an example of determination of a third factor. FIG. 11 illustrates an example of determination of an opposite lane vehicle detection index. FIG. 12 illustrates a result of determination of the opposite lane vehicle detection index. FIG. 13 illustrates another example of detection of a neighboring vehicle travelling in the opposite lane.

Referring to FIG. 3, a method for operating the sound detection apparatus 100 of FIG. 2, namely, a method for providing sound detection information is illustrated.

The signal processor 110 may receive sound data generated through analog-to-digital conversion of a detected sound generated around the vehicle 10 (S10).

The signal processor 110 may perform noise filtering on the acquired sound data, and the data storage device 120 may store the sound data with the noise removed (S20).

The sound recognition device 130 may extract feature values of the sound data received from the data storage device 120 in the time domain and frequency domain, and produce a result of sound classification by classifying the feature values through a classifier (S30).

The sound detector 140 may produce a result of sound detection, which is information about probabilities that an object corresponding to the sound type of a class which has a confidence level higher than or equal to a threshold in the result of sound classification is present at the respective angles in each of the temporally consecutive frames (S40).

The vehicle detector 150 may execute a vehicle detection algorithm to detect neighboring vehicle information from the probabilities of presence of a neighboring vehicle at the respective angles of the result of sound detection (S50).

The vehicle detection algorithm is intended to detect a neighboring vehicle from the result of sound detection.

The example of FIG. 5 assumes a driving situation in which the vehicle 10, namely the host vehicle, is travelling, and 10 vehicles travelling in the opposite lane (hereinafter, "opposite lane vehicles") to the left of the lane of the host vehicle pass by the host vehicle. In addition, it is assumed that the direction indicating the left side of the host vehicle is defined as 180°, the direction indicating the right side of the host vehicle is defined as 360°, and the direction indicating the rear side of the host vehicle is determined within the range between 180° and 360°.

FIG. 6 is a graph depicting the result of sound detection produced by the sound detector 140 in the driving situation of FIG. 5. In the graph, a darker portion may represent a higher probability of presence of a neighboring vehicle at the corresponding angle. In the graph, the horizontal axis represents time (in seconds) and the vertical axis represents angle θ.

In the present exemplary embodiment, it is assumed that the sound detector 140 does not produce a result of sound detection for the front area (the range between 0° and 180°) on the condition that neighboring vehicles in the front area (the range between 0° and 180°) other than the rear area (in the range between 180° and 360°) need not be detected.

Accordingly, a sound detection result is not produced for the front area (in the range between 0° and 180°) as shown in FIG. 6. Accordingly, the operation speed of the sound detection apparatus 100 may be increased, and power consumption may be reduced.

The graph of FIG. 6 depicts the results of sound detection produced when an opposite lane vehicle passes by the left side of the host vehicle in the areas from a first area A1 to a tenth area A10.

When the sound detection apparatus 100 detects a neighboring vehicle without operation of the opposite lane vehicle detector 160, the vehicle detector 150 may yield detection information indicating that a neighboring vehicle is present at angles having probabilities of presence higher than or equal to a certain probability (e.g., 0.6) in each frame of the result of sound detection. Accordingly, the vehicle detector 150 may generate a detection signal including information indicating that a neighboring vehicle is present at the rear left side in each of the areas from the first area A1 to the tenth area A10.

Accordingly, a driver notification may be generated based on the detection signal indicating that an opposite lane vehicle which does not affect travel of the host vehicle has been sensed. This notification may undermine driving safety.

Referring to FIG. 4, the opposite lane vehicle detector 160 may determine the first factor F1 based on the result of sound detection of the sound detector 140 (S51).

As described above, the sound detection result may include frames consecutive over time, and each frame may contain information about probabilities of presence of a neighboring vehicle at the respective angles (with increment of, for example, 1°).

The first factor F1 may be determined in Equation 1 below.

$$F1 = \sum_{all\ angles} \text{Difference in probability between frames at each angle} \quad \text{Equation 1}$$

Herein, the difference in probability between frames at each angle denotes a difference (absolute value) in probability between neighboring frames at each angle. For example, when the probability at 200° in the previous frame is 0.7, and the probability at 200° in the present frame is 0.6 (or 0.8), the probability difference between the frames is 0.1.

The first factor F1 is the sum of differences in probability between frames at each angle in the corresponding frame.

That is, as the probability difference between neighboring frames at each angle increases, the first factor F1 increases. In other words, when a neighboring vehicle having a high relative velocity is detected, the first factor F1 may have a high value.

An opposite lane vehicle may travel in the direction opposite to the travel direction of the host vehicle and have a significantly high relative velocity compared with a neighboring vehicle travelling in the same direction as the host vehicle. Accordingly, the first factor F1 may have a high value in a specific frame of the result of sound detection from the moment an opposite lane vehicle appears until the opposite lane vehicle disappears.

FIG. 7 shows a result obtained by determining the first factor F1 based on the result of sound detection of FIG. 6. It can be seen from FIG. 7 that the first factor F1 has a value greater than or equal to a certain level in all areas from the first area A1 to the tenth area A10 where an opposite lane vehicle appears.

The opposite lane vehicle detector 160 may determine a second factor F2 based on the result of sound detection of the sound detector 140 (S52).

The second factor F2 may be determined in Equation 2 below.

$$F2 = \sum_{180}^{N1} a(t-1) - a(t) + \sum_{N2}^{270} a(t) - a(t-1) \quad \text{Equation 2}$$

Herein, N1 denotes the lower one of the highest probability at an angle between 180° and 270° in the previous frame of the result of sound detection and the highest probability at an angle between 180° and 270° in the present frame of the result of sound detection, and N1 denotes the higher one of the highest probability at the angle between 180° and 270° in the previous frame of the result of sound detection and the highest probability at the angle between 180° and 270° in the present frame of the result of sound detection.

In addition, a(t−1) denotes probabilities at the respective angles in the previous frame, and a(t) denotes probabilities at the respective angles in the present frame.

Referring to FIG. 8, the probabilities at the respective angles in the previous frame are denoted by a(t−1), and the probabilities at the respective angles in the present frame are denoted by a(t). The angle corresponding to the highest probability among the angles in the previous frame is determined as N1, and the angle corresponding to the highest probability among the angles in the present frame is determined as N2.

The second factor F2 may be determined in Equation 2. The probabilities at the respective angles in each frame are typically distributed such that they are concentrated around an angle at which a neighboring vehicle is present. Accordingly, the second factor F2 has a positive value when an angular section in which high probabilities are concentrated is shifted to a larger angle in the present frame than in the previous frame, and the absolute value thereof increases as movement velocity increases.

On the other hand, the second factor F2 has a negative value when an angular section in which high probabilities are concentrated is shifted to a smaller angle in the present frame than in the previous frame, and the absolute value thereof increases as the movement speed increases.

In addition, the second factor F2 is determined in the range between 180° and 270° rather than in the range between 180° and 360°. This is because the maximum angular range in which an opposite lane vehicle may be detected around a host vehicle is between 180° and 270°, and thus the range between 270° and 360° may not be involved in determining the second factor F2 for determination of tendency of shift of an angular section in which the estimated vehicle is an opposite lane vehicle.

That is, the second factor F2 has a value indicating that the angular section in which high probabilities are concentrated (a section in which a neighboring vehicle is very likely to be present) tends to shift to a larger angle.

The opposite lane vehicle detector 160 may determine a third factor F3 based on the result of sound detection of the sound detector 140 (S53).

FIG. 9 shows a result of segmentation of the result of sound detection according to whether or not angles have a probability greater than or equal to 0.6. That is, in the result of sound detection, only the areas in which the probabilities greater than or equal to 0.6 at the corresponding angles and times are presented in black, and the other areas are presented in white.

The third factor F3 may be determined in Equation 3 below.

$$F3 = \begin{cases} 1 & \left(\begin{array}{c}\text{when there is a value in the}\\ \text{opposing lane vehicle detection area}\end{array}\right) \\ 0 & \left(\begin{array}{c}\text{when there is no value in the}\\ \text{opposing lane vehicle detection area}\end{array}\right) \end{cases} \quad \text{Equation 3}$$

According to the result of segmentation in FIG. 9, the areas from the first area A1 to the tenth area A10 include a portion having probabilities greater than or equal to 0.6 over an angular section wider than or equal to 1° in the angular range between 180° and 210°.

When an opposite lane vehicle passes by the left side of the host vehicle as shown in FIG. 10, the opposite lane vehicle is very likely to be detected in the angular area between 180° and 210° (i.e., the opposite lane vehicle detection area) with respect to the host vehicle. On the other hand, a neighboring vehicle travelling behind the host vehicle in the same lane is rarely likely to be detected in the opposite lane vehicle detection area.

Based on the features described above, the third factor F3 determined in Equation 3 is set to 1 when the opposite lane vehicle detection area of the corresponding frame includes a portion having probabilities greater than or equal to 0.6 over an angular area wider than or equal to 1°, and is set to 0 when the opposite lane vehicle detection area does not include any portion having probabilities greater than or equal to 0.6.

The opposite lane vehicle detector 160 may determine an opposite lane vehicle detection index FS by combining the first factor F1, the second factor F2, and the third factor F3 (S54). Herein, combining the first factor F1, the second factor F2, and the third factor F3 may mean that an operation is performed, taking the first factor F1, the second factor F2, and the third factor F3 as variables.

For example, the opposite lane vehicle detector 160 may determine the opposite lane vehicle detection index FS by multiplying the first factor F1 by the second factor F2 by the third factor F3 as shown in FIG. 11. However, embodiments of the present invention are not limited thereto.

In another exemplary embodiment, the opposite lane vehicle detector 160 may not use at least one of the first factor F1, the second factor F2, and the third factor F3 in determining the opposite lane vehicle detection index FS. In the instant case, one of steps S51 to S53 that corresponds to the factor which is not used may be omitted. For example, step S53 may be omitted, and the third factor F3 may not be used in determining the opposite lane vehicle detection index FS.

FIG. 12 shows the opposite lane vehicle detection index FS determined by multiplying the first factor F1, the second factor F2, and the third factor F3 determined for each frame using the methods illustrated in FIGS. 7 to 9 for the result of sound detection of FIG. 6.

The opposite lane vehicle detector 160 may detect an opposite lane vehicle based on the opposite lane vehicle detection index FS (S55).

In the graph of FIG. 12, the portions marked by a circle represent points at which the opposite lane vehicle detector 160 determines that an opposite lane vehicle is present. In FIG. 12, the opposite lane vehicle detector 160 may determine that there is an opposite lane vehicle when the opposite lane vehicle detection index FS is positive.

However, embodiments of the present invention are not limited thereto. The opposite lane vehicle detector 160 may determine that there is an opposite lane vehicle when the opposite lane vehicle detection index FS is positive, and is greater than or equal to a certain threshold (e.g., 10).

For the opposite lane vehicle detection index FS determined by multiplying the first factor F1, the second factor F2, and the third factor F3, the first factor F1 is an index indicating detection of a neighboring vehicle having a high relative velocity including an opposite lane vehicle, the second factor F2 is an index indicating tendency of shift of an angular section in which high probabilities are concentrated (a section in which a neighboring vehicle is very likely to be present) to a larger angle, and the third factor F3 is an index indicating whether or not there is an object detected in an angular area in which an opposite lane vehicle is very likely to be detected.

That is, an opposite lane vehicle has a high relative velocity as it travels in the direction opposite to the travel direction of the host vehicle. In addition, the opposite lane vehicle begins to be detected at around 180° and travels in the direction of 270°, and is very likely to be detected in an angular section between 180° and 210°. When all these conditions are met, the opposite lane vehicle detection index FS may have a great positive value. Using this feature, the opposite lane vehicle detector 160 may accurately detect the opposite lane vehicle.

In FIG. 12, the opposite lane vehicle detection index FS transitions to negative numbers immediately before transitioning to positive numbers. This is because the angular section in which high probabilities are concentrated tends to momentarily appear to shift to the lowest angle when an opposite lane vehicle is suddenly detected at around 180°.

FIG. 13 illustrates detection of an opposite lane vehicle from a result of sound detection different from the result of FIG. 6.

The result of sound detection (the upper portion) of FIG. 13 is obtained when an opposite lane vehicle passes by the left side of the host vehicle in each of the eleventh area B1 and twelfth area B2.

The graph of the opposite lane vehicle detection index FS (the lower portion) of FIG. 13 depicts a result of determination of the opposite lane vehicle detection index FS performed by the opposite lane vehicle detector 160 from the result of sound detection through steps S51 to S55.

That is, it can be seen from the example of FIG. 13 that the opposite lane vehicle detector 160 may accurately detect an opposite lane vehicle passing by the host vehicle in the eleventh area B1 and twelfth area B2.

The vehicle detector 150 may generate a detection signal for the neighboring vehicle information without the information about the detected opposite lane vehicle (S56).

The vehicle detector 150 may generate neighboring vehicle information including presence of a neighboring vehicle and an angle at which a neighboring vehicle is positioned from the probability of presence of the neighboring vehicle at each angle of the result of sound detection.

When the opposite lane vehicle detector 160 detects an opposite lane vehicle in the n-th frame of the result of sound detection (where n is a positive integer greater than or equal to 1), the vehicle detector 150 may output a detection signal for neighboring vehicle information without information about presence or absence of the opposite lane vehicle and the angle at which the opposite lane vehicle is positioned.

When the opposite lane vehicle is detected along with another neighboring vehicle at the rear right side in the n-th frame, the neighboring vehicle information may include only the information about presence of the other neighboring vehicle and the angle at which the other neighboring vehicle is positioned.

Referring back to FIG. 3, the notification generator 170 may generate a notification signal containing information about a neighboring vehicle according to the detection signal of the vehicle detector 150. The notification output device 200 receives this information and provides the driver with information about a sound generating area (S60).

While description has been given above on the condition of a road environment in which traffic keeps to the right and thus an opposite lane vehicle passes by the left side of the host vehicle, it is apparent that the technical spirit of the present invention is also applicable to a road environment in which traffic keeps to the left.

Accordingly, with a method for providing sound detection information, an apparatus for detecting sound around a vehicle, and a vehicle including the same according to an exemplary embodiment of the present invention, presence or absence of an opposite lane vehicle travelling in the lane opposite to the lane of a host vehicle may be accurately detected.

In addition, safe driving may be assisted by selectively disabling a driver notification according to vehicle detection depending on whether the detected vehicle is a vehicle in the opposite lane.

The method for providing sound detection information described above may be implemented in a computer-readable recording medium as code readable by a computer. The computer-readable recording medium includes all kinds of recording media configured to store data readable by the computer system. Examples of the computer-readable recording media include ROMs (read-only memories), RAMs (random access memories), magnetic tapes, magnetic disks, flash memories and optical data storage devices. The computer-readable recording media may be distributed to computer systems connected over a network, and thus computer-readable code may be stored and executed in a distributed manner.

As apparent from the above description, the present invention has effects as follows.

With a method for providing sound detection information, an apparatus for detecting sound around a vehicle, and a vehicle including the same according to an exemplary embodiment of the present invention configured as above, presence of a vehicle travelling in the opposite lane relative to a host vehicle may be accurately detected.

In addition, generation of a notification to a driver according to vehicle detection is selectively disabled when a detected vehicle is a vehicle in the opposite lane. Accordingly, the driver may be assisted in safe driving.

It will be appreciated by those skilled in the art that the effects that can be achieved with the present invention are not limited to what has been described above and other advantages of the present invention will be clearly understood from The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for providing sound detection information, comprising:
   producing a result of sound detection based on sound data generated by detecting sound generated around a host vehicle;
   determining an opposite lane vehicle detection index based on the result of sound detection, the opposite lane vehicle detection index forming a basis of determination of presence or absence of an opposite lane vehicle; and
   controlling a notification of a neighboring vehicle travelling around the host vehicle or controlling the host vehicle according to the opposite lane vehicle detection index,
   wherein the result of sound detection is information about a probability of presence of the neighboring vehicle for respective angles in frames consecutive over time, and
   wherein the determining of the opposite lane vehicle detection index includes: determining a first factor corresponding to a sum of differences in probability between frames of the result of sound detection at the respective angles.

2. The method according to claim 1, wherein the determining of the opposite lane vehicle detection index includes:
   determining a second factor indicating tendency of an angular section having high probabilities concentrated therein to shift to a higher angle as the frames of the result of sound detection are produced.

3. The method according to claim 2, wherein the second factor is determined using probabilities at the respective angles in a previous frame and probabilities at the respective angles in a present frame within a section of the result of sound detection between 180° and 270°.

4. The method according to claim 2, wherein the determining of the opposite lane vehicle detection index includes:

determining a third factor indicating whether or not an opposite lane vehicle detection area of the result of sound detection has an angle having a probability higher than or equal to a predetermined probability.

5. The method according to claim 4, wherein the determining of the opposite lane vehicle detection index further includes:
determining the opposite lane vehicle detection index by multiplying the first factor by the second factor by the third factor.

6. The method according to claim 1, wherein the controlling of the notification of the neighboring vehicle or the host vehicle includes:
detecting the opposite lane vehicle based on the opposite lane vehicle detection index; and
generating the notification according to a detection signal excluding the detected opposite lane vehicle.

7. An apparatus for detecting sound around a vehicle, the apparatus including:
a sound detector for producing a result of sound detection based on sound data generated by detecting sound generated around a host vehicle;
an opposite lane vehicle detector for determining an opposite lane vehicle detection index based on the result of sound detection, the opposite lane vehicle detection index forming a basis of determination of presence or absence of an opposite lane vehicle; and
a notification generator for generating a notification of a neighboring vehicle travelling around the host vehicle according to the opposite lane vehicle detection index,
wherein the result of sound detection is information about a probability of presence of the neighboring vehicle for respective angles in frames consecutive over time, and
wherein the opposite lane vehicle detector is configured to determine a first factor corresponding to a sum of differences in probability between frames of the result of sound detection at the respective angles.

8. The apparatus according to claim 7, wherein the opposite lane vehicle detector is configured to determine a second factor indicating tendency of an angular section having high probabilities concentrated therein to shift to a higher angle as the frames of the result of sound detection are produced.

9. The apparatus according to claim 8, wherein the second factor is determined using probabilities at the respective angles in a previous frame and probabilities at the respective angles in a present frame within a section of the result of sound detection between 180° and 270°.

10. The apparatus according to claim 8, wherein the opposite lane vehicle detector is configured to determine a third factor indicating whether or not an opposite lane vehicle detection area of the result of sound detection has an angle having a probability higher than or equal to a predetermined probability.

11. The apparatus according to claim 10, wherein the opposite lane vehicle detector is configured to determine the opposite lane vehicle detection index by multiplying the first factor by the second factor by the third factor.

12. The apparatus according to claim 7, wherein the notification generator generates the notification according to a detection signal excluding the detected opposite lane vehicle, based on the opposite lane vehicle detection index.

13. A vehicle including:
a multichannel microphone for generating sound data by detecting sound generated around a host vehicle;
a sound detection apparatus for determining an opposite lane vehicle detection index based on a result of sound detection produced based on the sound data and generating a notification of a neighboring vehicle travelling around the host vehicle according to the opposite lane vehicle detection index, the opposite lane vehicle detection index forming a basis of determination of presence or absence of an opposite lane vehicle;
a notification output device for visibly or audibly delivering the notification of the neighboring vehicle to a driver,
wherein the result of sound detection is information about a probability of presence of an object corresponding to a target sound source at respective angles in frames consecutive over time, and
wherein the sound detection apparatus is configured to determine a first factor corresponding to a sum of differences in probability between frames of the result of sound detection at the respective angles.

* * * * *